H. OTT.
CEMENT DIVIDER.
APPLICATION FILED JUNE 2, 1916.

1,242,032.

Patented Oct. 2, 1917.

Witness:
J. P. Stabler.
James J. Donegan.

Inventor
Henry Ott.
By
Attorney

UNITED STATES PATENT OFFICE.

HENRY OTT, OF LANCASTER, NEW YORK.

CEMENT-DIVIDER.

1,242,032.  Specification of Letters Patent.  Patented Oct. 2, 1917.

Application filed June 2, 1916. Serial No. 101,333.

*To all whom it may concern:*

Be it known that I, HENRY OTT, a citizen of the United States, residing at Lancaster, in the county of Erie and State of New York, have invented certain new and useful Improvements in Cement-Dividers; and I do hereby declare the following to be a full, clear, and exact description of the invention, such as will enable others skilled in the art to which it appertains to make and use the same.

This invention relates to cement dividers, and one object of the invention is the provision of a divider that will admit of a sack of cement being emptied therein, and expeditiously and conveniently divided into equal parts.

Another object of the invention is the provision of a divider of this nature, formed of a pair of removably superposed and communicating sections, which receive the cement, the upper section having a novel type of dividing blade that divides the cement into equal parts and forms a closure for the lower end of the upper section after the dividing operation.

Other objects will appear and be better understood from that embodiment of my invention of which the following is a specification, reference being had to the accompanying drawings forming a part thereof, in which.

Figure 1:
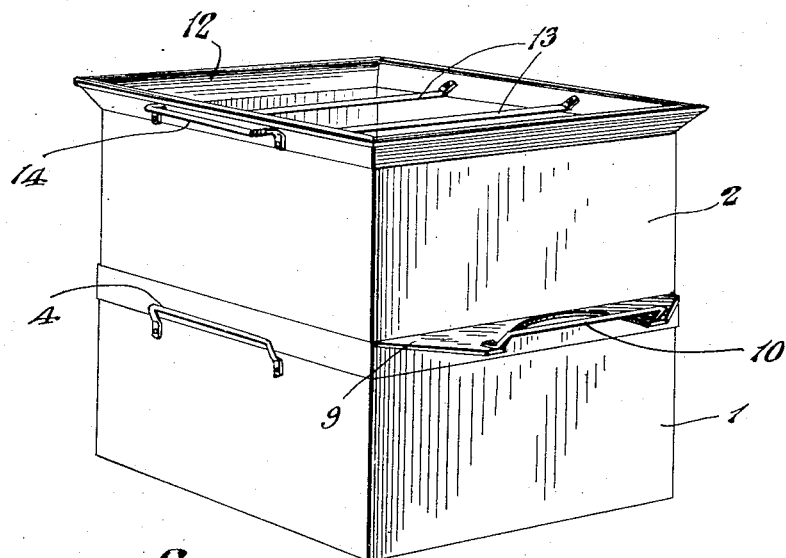
Figure 1 is a perspective view of the divider.

Referring to the drawings in detail, the numerals 1 and 2 designate a pair of superposed and detachably connected rectangular shaped hollow sections, which, when in operative position, form a receptacle for the cement when the same is discharged from the sack. The lower section 1 has the upper edges of the walls thereof provided with a reinforcing band 3, and certain opposite walls of the lower section 1 are provided with handles 4. The capacities of the sections 1 and 2 are equal and the lower edges of the walls of the upper sections 2 are offset inwardly, as shown at 5, to provide the shoulders 6. When the sections 1 and 2 are in operative position, the offset end of the section 2 is received by the upper end of the lower section 1, and the shoulders 6 rest upon the upper edges of the walls of the lower section 1, so as to limit the downward movement of the section 2.

Figure 2:
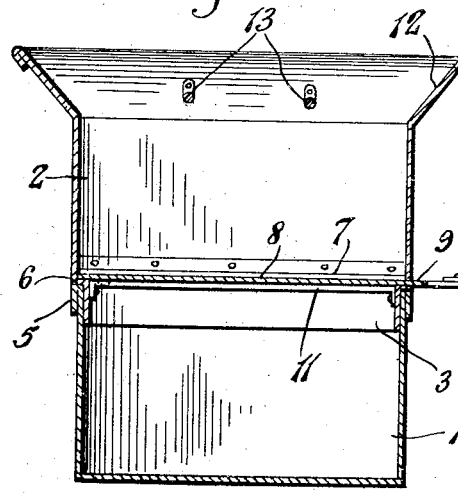
Fig. 2 is a vertical sectional view, taken through the same.
Figure 3:
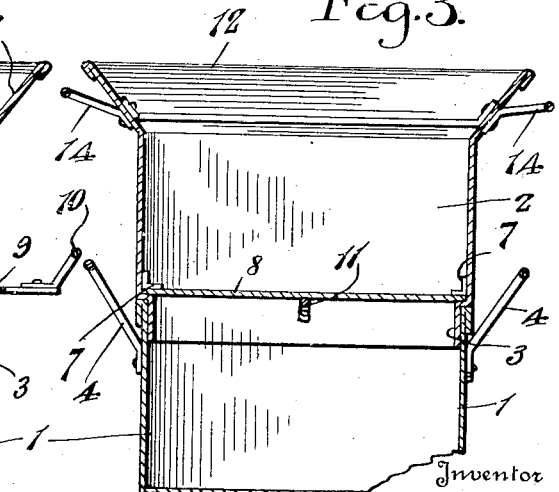
Fig. 3 is a vertical sectional view, taken through the divider and through the dividing blade.

Angle bars 7 are secured to the inner surfaces of certain of the opposed walls of the upper section 2, and extend in parallelism and arranged in spaced relation with the adjacent shoulders 6 and form guides which receive the longitudinal edges of the rectangular shaped dividing blade 8. This dividing blade 8 is operable through an elongated slot formed in another of the walls of the upper section 2, at a point above the shoulders 6, as shown in Fig. 2 of the drawings. The length of the blades 8 exceeds the width of the section 2, and the outer end of the blade is restricted, as shown at 9, and provided with a manipulating handle 10. When the blade 8 is moved inwardly, the same closes the lower end of the upper section 2 and forms a bottom wall for the upper section 2, as shown more particularly in Fig. 2 of the drawings.

When it is desired to divide a sack of cement into equal parts, the blade 8 is moved outwardly to its maximum outward position, and the cement emptied into the receptacle so as to fill the same. The blade 8 is then moved inwardly to the position shown in Fig. 2 of the drawings, resulting in the cement being divided into equal parts, and the blade 8 closing the upper end of the lower section 2, so that the divided portions of the cement will be prevented from commingling. A rod 11 extends across the interior of the lower end of the upper section 2, and beneath the blade 8, and serves as means for reinforcing the blade against the strain exerted thereon by the cement contained in the upper section 2.

The upper ends of the walls of the section 2 are flared outwardly, as shown at 12, to admit of the emptying of the cement being facilitated.

A pair of spaced and parallel rods 13 extend across the upper end of the upper section 2 and have their opposite ends connected to certain opposite flared portions 12, said rods 13 serving as rests for the sack of cement during the discharge of the cement into the superposed sections 1 and 2.

After the cement has been divided in the manner above described, the upper section 2 can be detached from position on the section 1, this being facilitated by means of handles 14 which are located adjacent the upper end of certain of the walls of the upper section 2.

Having thus described my invention what I claim as new, is:

1. A device of the class described comprising a lower section, an upper section detachably mounted on the lower section and having its lower end offset inwardly to provide opposed shoulders, bars located above the shoulders and in spaced relation thereto and coöperating with the shoulders to define opposed guides and a dividing element slidable through the upper section and received by the guides.

2. A divider of the class described comprising a lower section, and an upper section mounted on the lower section and having its lower end offset inwardly and detachably extending into the lower section, a dividing blade operable through the upper section and located adjacent the lower end of the upper section, and a rod extending across the lower end of the upper section and located below and adjacent to the dividing blade.

In testimony whereof I affix my signature in presence of two witnesses.

HENRY OTT.

Witnesses:
ALBERT H. LOESCH,
HENRY J. MAUTE.

Copies of this patent may be obtained for five cents each, by addressing the "Commissioner of Patents, Washington, D. C."